United States Patent [19]
Grimshaw et al.

[11] Patent Number: 5,273,614
[45] Date of Patent: Dec. 28, 1993

[54] TOW GUIDE FOR REDIRECT ROLLERS IN A FIBER PLACEMENT MACHINE

[75] Inventors: Michael N. Grimshaw, Milford, Ohio; Milo M. Vaniglia, Alexandria, Ky.

[73] Assignee: Cincinnati Milacron Inc., Cincinnati, Ohio

[21] Appl. No.: 764,269

[22] Filed: Sep. 23, 1991

[51] Int. Cl.⁵ ............................ B32B 31/00; B65H 81/00
[52] U.S. Cl. ........................................ 156/433; 156/425; 156/441; 226/190
[58] Field of Search .............. 156/361, 425, 428–430, 156/433, 441, 523, 574; 226/190, 196; 242/76, 7, 21; 29/121.6

[56] References Cited

U.S. PATENT DOCUMENTS

| | | | |
|---|---|---|---|
| 2,704,794 | 3/1955 | Hanson | 29/121.6 X |
| 2,717,285 | 9/1955 | Rayburn | 29/121.6 X |
| 3,307,998 | 3/1967 | Boggs | 156/425 X |
| 4,822,444 | 4/1989 | Weingart | 156/441 |
| 4,872,619 | 10/1989 | Vaniglia | 156/361 X |
| 4,877,193 | 10/1989 | Vaniglia | 156/361 X |
| 5,022,952 | 6/1991 | Vaniglia | 156/441 |
| 5,045,147 | 9/1991 | Benson et al. | 156/425 X |

Primary Examiner—Jeff H. Aftergut
Attorney, Agent, or Firm—Thomas M. Farrell

[57] ABSTRACT

Redirect rollers are fitted with non-rotating upstanding fins to provide enhanced guidance for spaced tows which wrap the rollers.

6 Claims, 5 Drawing Sheets

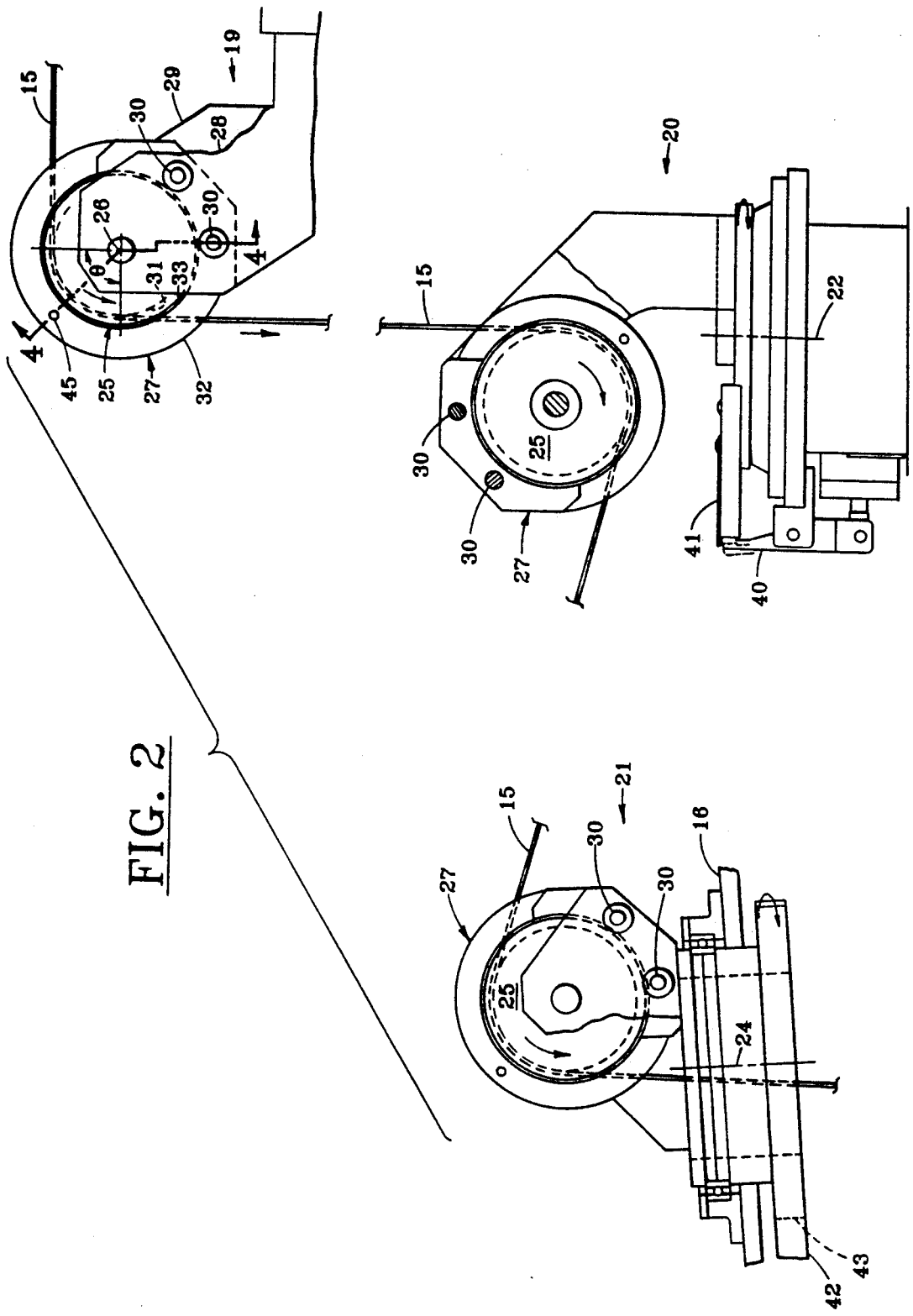

TOW GUIDE FOR REDIRECT ROLLERS IN A FIBER PLACEMENT MACHINE

FIELD OF INVENTION

This invention concerns separation and guidance of tows in a fiber placement machine.

BACKGROUND OF THE INVENTION

In a fiber placement machine, multiple tows, or rovings, of fiber reinforced pre-pregged resin run side-by-side from a tow supply source (typically a creel having several spools of tow material) to a work zone, the tows being applied by a tow dispensing head. The tows may pass over several redirect roller sets while running from the supply to the head. The roller sets have closely-spaced independent grooved rollers, providing short, upstanding flanges at either side of the tow for guidance and containment. In a machine such as the FPX fiber placement machine, available from Cincinnati Milacron Inc., the subject matter of U.S. Pat. No. 5,022,952, the head is maneuvered through a variety of spatial orientations relative to the creel, thus drastically changing the tow path and, potentially creating momentary slack in the tows. It has, therefore, been determined that it would be beneficial to have more guiding surface at the sides of a tow. However, if the roller flanges are increased in diameter, the relatively narrow, very deep, roller groove would be substantially more difficult to manufacture. And, owing to the very close spacing of the rollers, the increased outer flange surfaces would necessitate a finishing to high degree of flatness and squareness, the larger rollers being less tolerant to flange run-out. Since the usual case finds the tow well-seated in the roller groove, it is preferred that increased side guidance be provided at a relatively low cost for materials and assembly effort.

This invention achieves the goal of having increased side guidance for a tow running along a tow path from a creel to a dispensing head, while obviating the previously mentioned difficulties inherent in having a narrow grooved roller with increased flange diameters.

SUMMARY OF THE INVENTION

The invention is shown embodied in a tow guide for use in a fiber placement machine, where at least one fiber reinforced tow runs along a path from an upstream tow supply to a downstream tow application work zone, with the tow passing over at least one guide roller along its path, and the guide roller being journalled for rotation about its central longitudinal axis, the tow guide comprising:

first and second radially-extending fins subtending an arc around the periphery of the roller, the fins each having an outer edge portion extending beyond the outer radius of the roller; and means for mounting the fins in an axially-spaced assembly along the axis of the roller.

BRIEF DESCRIPTION OF THE DRAWINGS

FIG. 2 is an enlarged schematic view showing the three redirect roller sets of FIG. 1.

DESCRIPTION OF THE PREFERRED EMBODIMENT

While certain attitudinal references are mentioned herein, i.e., "horizontal", "down", etc., such references are for convenience in following the drawings, and are not limitations of the invention, as the invention may be applied in a variety of orientations.

Figure 1:
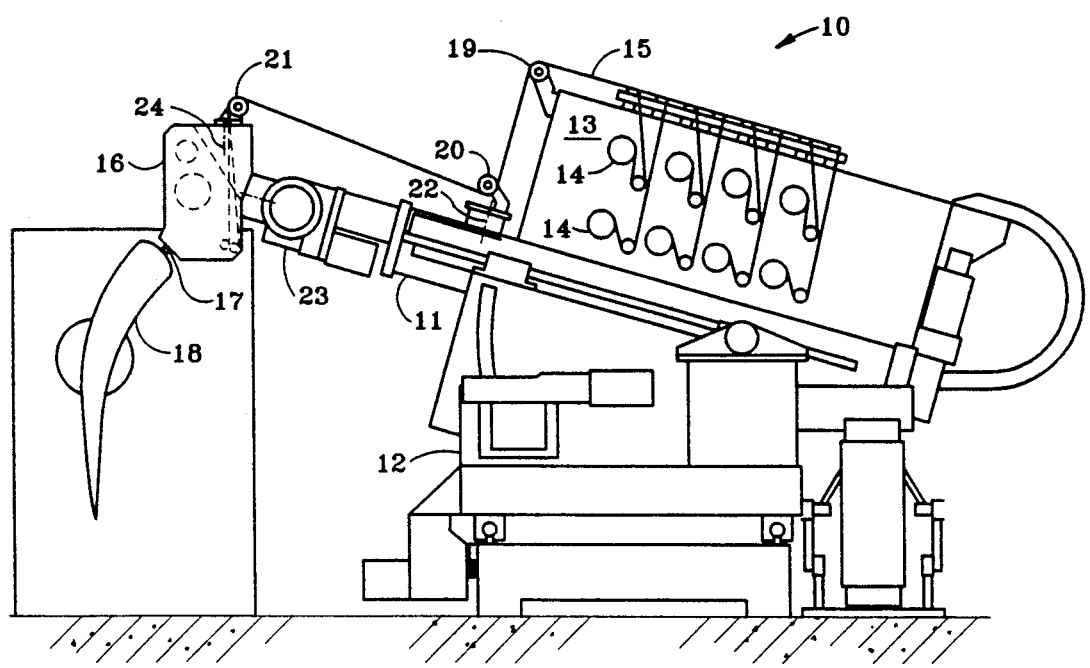
FIG. 1 is an end elevational view of a fiber placement machine having a fiber supply creel and a movable tow dispensing head separated from the creel.

FIG. 1 shows an end elevational view of a fiber placement machine 10, shown and described in U.S. Pat. No. 5,022,952, assigned to Cincinnati Milacron Inc., the assignee of this invention, and that patent disclosure is expressly incorporated herein by reference. In the machine 10, a cross-slide 11 and carriage assembly 12 support a creel 13, containing plural spools 14 of fiber reinforced tows 15, running to a tow placement head 16 carried at the end of the cross-slide 11. The tows 15 are dispensed by the head 16 at a work zone 17, illustrated in FIG. 1 as a point on an air foil mandrel 18. As the tows 15 run from the upstream creel 13 to the downstream fiber placement head 16, they are routed over three sets 19,20,21 of redirect rollers. The first roller set 19 of is held in a fixed relationship with the creel 13. The second redirect roller set 20 is permitted to swivel about an axis 22 to properly align the tows 15 running along the tow path as the fiber placement head 16 is oriented by a multi-axis manipulator wrist 23. The third set 21 of redirect rollers is mounted to the head 16 and is also able to swivel about an axis 24. The second and third redirect roller sets 20,21 are the subjects of U.S. Pat. Nos. 4,877,193 and 4,872,619, assigned to Cincinnati Milacron Inc., and those patent disclosures are expressly incorporated herein by reference.

Figure 3:
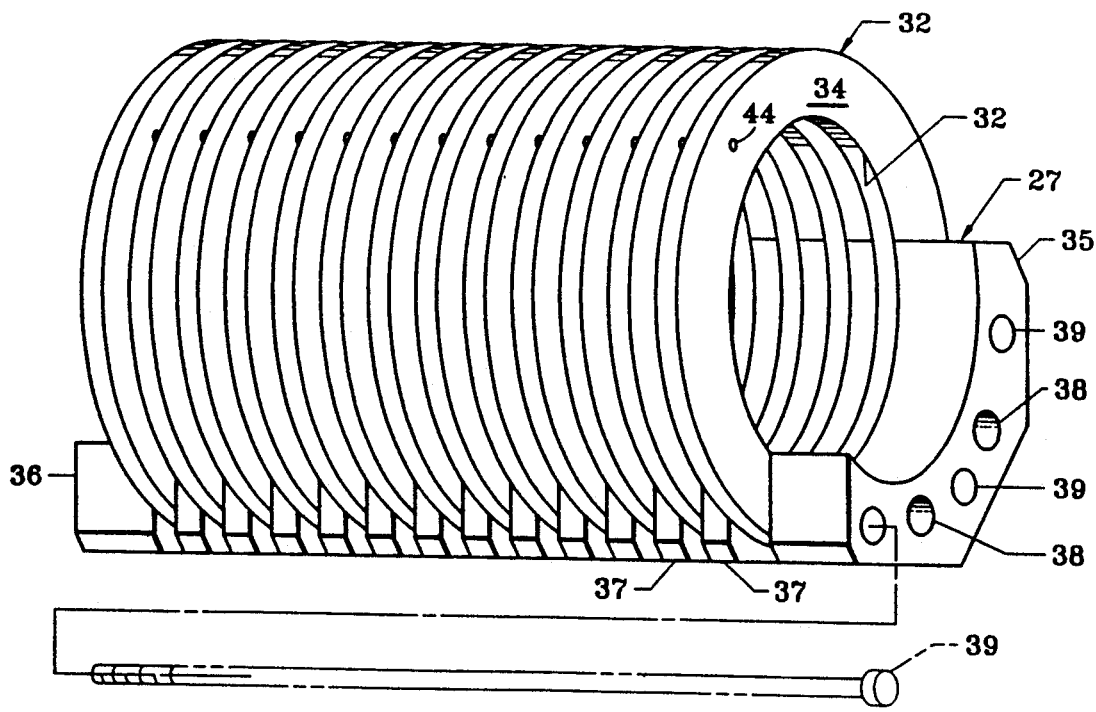
FIG. 3 is a perspective view of a tow guide assembly removed from the redirect roller set.

Referring to the enlarged schematic of FIG. 2, the first redirect roller set 19 comprises a grooved roller assembly 25 journalled for free rotation about a roller axis 26 and which is surrounded by a non-rotating tow guide assembly 27. The tow guide assembly 27 is affixed to two parallel side brackets 28,29 having a common profile. Two pins 30 from each side (see also FIG. 4) position and fix the tow guide assembly 27 against rotation. The incoming tow 15 runs around a tow wrap arc sector Θ of the roller groove 31, and is bracketed at its sides by a disk-shaped upstanding fin 32 having a central clearance bore 33. With reference to FIG. 3, the tow guide assembly 27 is comprised of thin a plurality of circular disks 34, mounted between crescent-shaped end blocks 35,36 and separated by crescent-shaped spacers 37. The end blocks 35,36 are each provided with two pin holes 38, and a plurality of long screws 39 pass through the entire assembly 27 to clamp the interlaminated disks 34 and spacers 37. In the preferred embodiment, the disks 34 are made of an engineering grade plastic; for example, Delrin, nylon, or ultrahigh molecular weight polyethylene (UHMW-PE). It will be readily appreciated by those skilled in the art that the tow guide assembly 27 could be produced from a unitary molded piece of engineering grade plastic.

With reference back to FIG. 2, the tow guide assembly 27 is simply depicted as a unitary structure, where the crescent-shaped end blocks 35,36 are oriented diametrically-opposite to the tow wrap arc sector Θ. The tow 15 enters the first redirect roller set 19 in a horizontal attitude from the creel 13 of FIG. 1, wraps counterclockwise around the second quadrant of the roller assembly 25 and passes down to the second redirect roller set 20. The tow 15 wraps clockwise around the fourth quadrant of the second set 20 and runs to the third redirect roller set 21. The tow 15 then wraps counterclockwise around the second quadrant of the third redirect roller set 21 and runs through the fiber placement head 16. The second redirect roller set is mounted to swivel, under tow tension, about an axis 22, in casterlike fashion. A latching pawl 40, engageable with the swivel plate 41 at various times for aligning the machine 10, plays no part in this invention. The third redirect roller set 21 is mounted for rotation under the influence of a servomotor drive (not shown), by means of a belt 42 driving to a pulley 43 of the redirect roller set 21.

The disks 34 are each provided with a small hole 44 at a point radially displaced from the tow wrap arc sector Θ. A snug-fitting plastic rod 45 extends through the holes 44 (see FIG. 4), and functions as a radial keeper, bridging the tows 15 and assuring that, should an undesirable slackening occur, the tows 15 will not jump the upstanding fin 32, or disk 34, to an adjacent groove 31.

Figure 4:
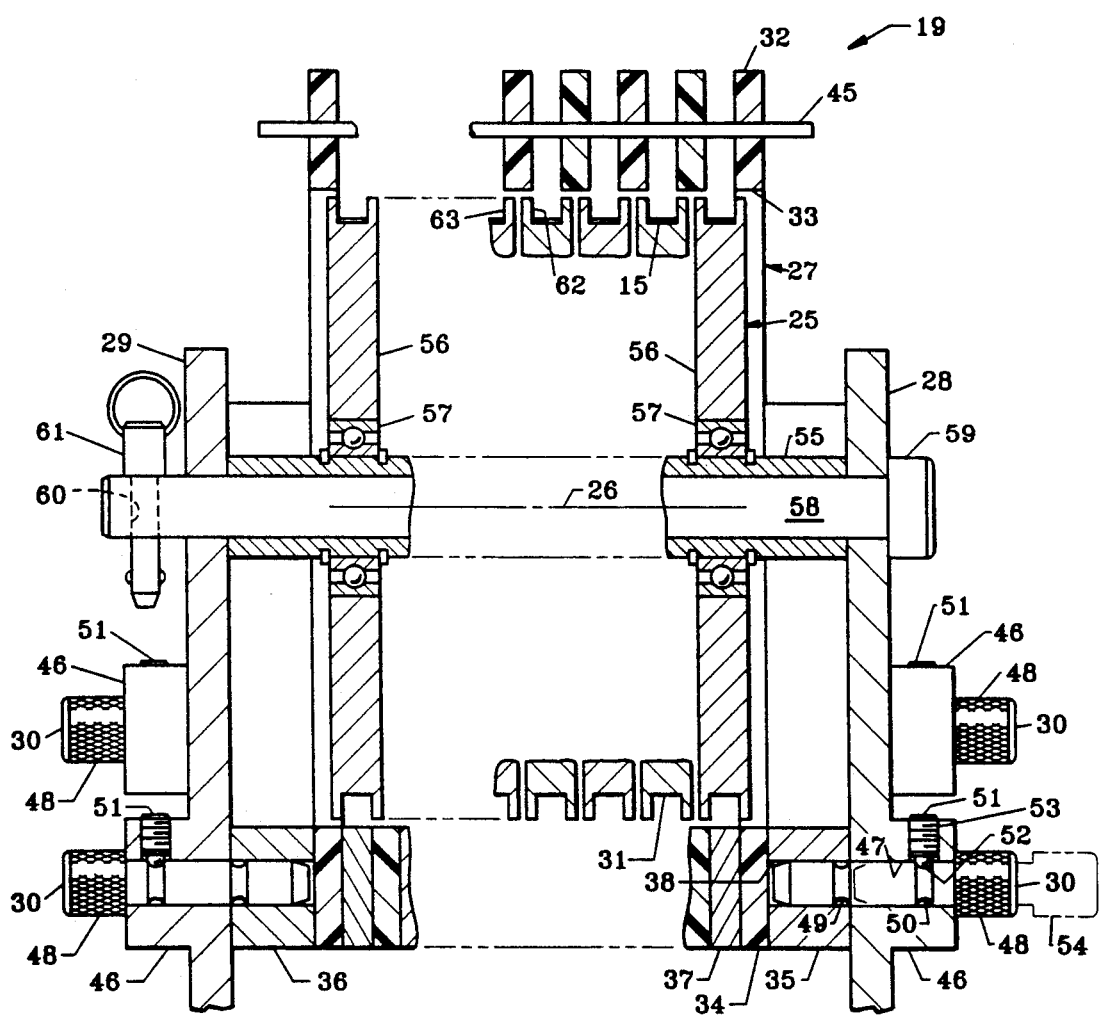
FIG. 4 is an enlarged sectional view taken along the line 4—4 of FIG. 2, showing the relationship of the tow guide assembly to the roller assembly.

The sectional view of FIG. 4 shows the side brackets 28,29 of the first redirect roller set 19, but the assembly is common for all three redirect roller sets 19,20,21. Each side bracket 28,29 has two bosses 46, each boss 46 having a central bore 47 extending through the side brackets 28,29. A pin 30, having a knurled head 48, is inserted into each bore 47. The pin 30 has a pair of spaced annular grooves 49,50, which are detented by a spring plunger 51 having a ball tip 52 and threaded body 53 radially received through the boss 46. When fully inserted, the pins 30 extend into the pin holes 38 of the crescent-shaped end blocks 35,36; when it is desired to disassemble the unit, the pins 30 can be snapped out to the phantom position 54 shown. The roller assembly 25 is comprised of a tubular arbor 55, to which grooved rollers 56 are mounted, each roller 56 having an antifriction bearing 57 for independent free rotation, the rollers 56 being slightly spaced to avoid rubbing. The roller assembly 25 rides on a shaft 58 which extends through the side brackets 28,29, where the shaft 58 has a head 59 at one end and a cross-drilled hole 60 at the other, through which extends a quick release pin 61. The upstanding fin 32, comprised of the circular disk 34, is thick enough to span the opposed flanges 62,63 of adjacent rollers 56. In the example of FIG. 3, thirteen disks 34 are provided to handle twelve grooved rollers 56. The plastic rod 45 extends through the disks 34 with a snug fit and is easily withdrawn by an operator, when it is desired to rethread the assembly.

In order to disassemble the unit, the quick release pin 61 is pulled, the shaft 58 is withdrawn, and the knurled head pins 30 are snapped to their out positions 54; the roller assembly 25 and tow guide assembly 27 can then be lifted out. Reassembly is the reverse process.

Figure 5:
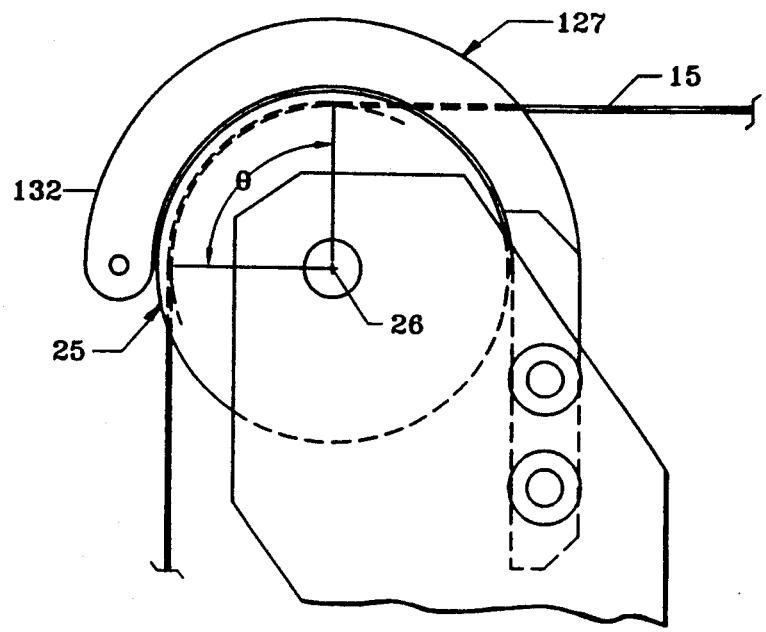
FIG. 5 is a side elevational view of an alternate embodiment.

FIG. 5 shows an alternate embodiment of the a tow guide assembly 127, where the upstanding fin 132 which surrounds the tow wrap arc sector Θ is not continuous, but performs the same function as the disk 34 and subtends the roller assembly 25 throughout the necessary tow wrap arc sector Θ.

Figure 7:
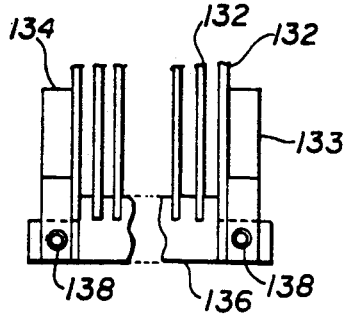
FIG. 7 is a front elevational view taken along line 7—7 of FIG. 6.
Figure 6:
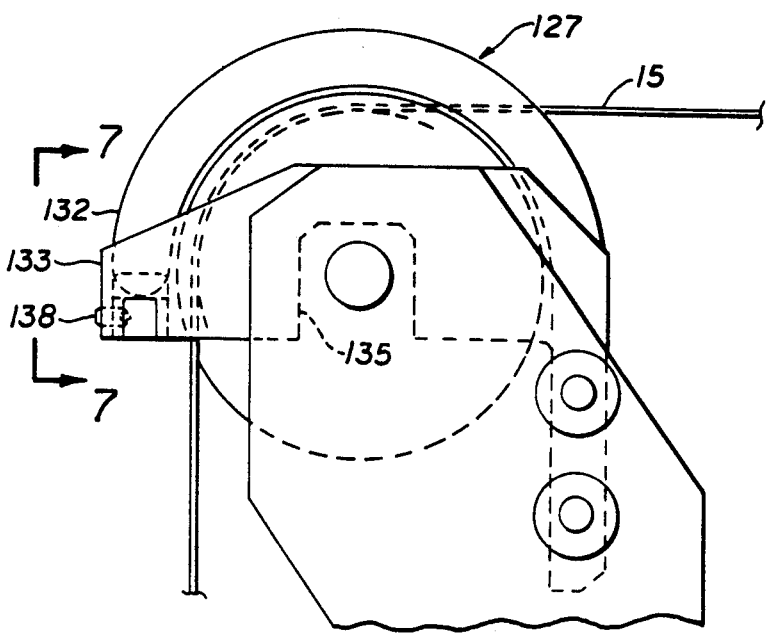
FIG. 6 is a side elevational view of a further alternate embodiment.

FIGS. 6 and 7 show a further alternate embodiment, similar to that shown in FIG. 5, designed to provide further support for the thin fins 132. The side plates 133,134 extend beyond the fins 132, and have clearance slots 135 for ease of assembly. The outboard ends of the side plates 133,134 are slotted to receive a spacer bar 136. The spacer bar has slots 137 (see FIG. 8) which closely fit the fins 132, and prevent side-to-side vibration. The bar 136 is retained with the side plates 133,134 by spring plungers 138 which snap into spot-drilled holes 139 in the bar 136. Thus, the bar 136 may be easily removed by hand when it is desired to re-thread the tows 15.

Figure 8:
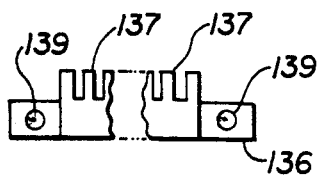
FIG. 8 is a front elevational view of the spacer bar of FIG. 7.
Figure 9:
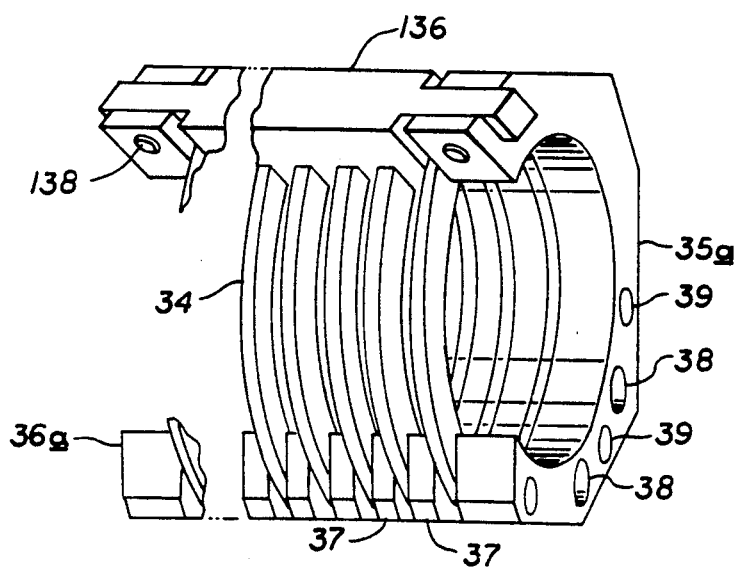
FIG. 9 is a side elevational view of another alternate embodiment.

FIG. 9 shows another embodiment, similar to that of FIGS. 6-8, for use with the full circular discs of FIG. 3. In this design, the crescent-shaped end blocks 35,36 of FIG. 3 are replaced with blocks 35a,36a, which have a longer arcuate wrap, and which are slotted and provided with spring plungers 138 to hold the spacer bar 136.

While the invention has been shown in connection with a preferred embodiment and several alternate embodiments, it is not intended that the invention be so limited, rather, the invention extends to all such designs and modifications as come within the scope of the appended claims.

What is claimed is:

1. A tow guide for use in a fiber placement machine where at least one fiber reinforced tow runs along a path from an upstream tow supply to a downstream tow application work zone, the tow passing over at least one guide roller located along its path, the guide roller being journalled for, rotation about its central longitudinal axis, the tow guide comprising:

first and second radially extending fins subtending an arc around the periphery of said roller, said fins each having an outer edge portion extending beyond the outer radius of said roller; and means for mounting said fins in an axially spaced assembly along said axis.

2. The tow guide of claim 1, wherein said fins are fixed against rotation about said axis.

3. The tow guide of claim 2, wherein said roller is journalled with a roller support housing, and said fins are mounted to said roller support housing.

4. The tow guide of claim 3, wherein said fins each comprise a thin circular disc held in unitary spaced laminar assembly with a tow guide base.

5. The tow guide of claim 4, wherein said fins are made of plastic.

6. The tow guide of claim 1, further comprising means for bridging said fins and radially-containing said tows.

* * * * *